(12) United States Patent
Shimizu et al.

(10) Patent No.: US 9,478,369 B2
(45) Date of Patent: Oct. 25, 2016

(54) ALIGNING DEVICE

(71) Applicant: Murata Manufacturing Co., Ltd., Nagaokakyo-shi, Kyoto-fu (JP)

(72) Inventors: Kotaro Shimizu, Nagaokakyo (JP); Masaharu Sano, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 219 days.

(21) Appl. No.: 14/488,448

(22) Filed: Sep. 17, 2014

(65) Prior Publication Data

US 2015/0082591 A1    Mar. 26, 2015

(30) Foreign Application Priority Data

Sep. 26, 2013  (JP) ................... 2013-199502
Jul. 3, 2014  (JP) ................... 2014-137662

(51) Int. Cl.
*B23P 19/00*    (2006.01)
*H01G 13/00*    (2013.01)

(52) U.S. Cl.
CPC ............. *H01G 13/00* (2013.01); *Y10T 29/43* (2015.01); *Y10T 29/49002* (2015.01)

(58) Field of Classification Search
CPC ......... H05K 2201/09054; H05K 2201/09745; Y10T 428/12361; Y10T 29/49826; Y10T 29/4913
USPC ...... 29/759, 25.42, 758, 760, 771, 832, 874, 29/875; 118/67, 68, 423, 503, 642
See application file for complete search history.

(56) References Cited

U.S. PATENT DOCUMENTS 4,393,808 A * 7/1983 Braden ................ H05K 13/028
                                                                118/503
8,938,875 B2 * 1/2015 Miyazaki ............... H01G 4/005
                                                                29/758
2012/0297608 A1    11/2012 Miyazaki

FOREIGN PATENT DOCUMENTS

JP    2010-278153 A    12/2010
WO    2010/137546 A1    12/2010

* cited by examiner

*Primary Examiner* — Thiem Phan
(74) *Attorney, Agent, or Firm* — Keating & Bennett, LLP

(57) ABSTRACT

In an aligning device, in plan view, a first recess of a first transfer jig allows an entire region of a second recess of the first transfer jig to be situated within the first recess of the first transfer jig by a predetermined interval. A first recess of a second transfer jig allows an entire region of a second recess of the second transfer jig to be situated within the first recess of the second transfer jig by a predetermined interval. When the first transfer jig and the second transfer jig overlap each other, the first recess of the second transfer jig allows the entire region of the second recess of the first transfer jig to be situated within the first recess of the second transfer jig by a predetermined interval. The alignment object is transferred from the cavity of said first jig to a cavity of said second jig.

13 Claims, 16 Drawing Sheets

ALIGNING DEVICE

BACKGROUND OF THE INVENTION

1. Field of the Invention

The present invention relates to an aligning device that is used in aligning alignment objects, such as electronic component elements, in, for example, a process for producing an electronic component, such as a multilayer chip ceramic capacitor or a chip inductor, and also relates to a method for producing an electronic component using the aligning device.

2. Description of the Related Art

In recent years, there has been a strong demand for reducing the size, in particular, the thickness (the height) of an electronic chip component. As aligning devices for aligning thin electronic components, for example, an aligning device such as that described in Japanese Unexamined Patent Application Publication No. 2010-278153 is proposed.

That is, Japanese Unexamined Patent Application Publication No. 2010-278153 describes a component aligning device including a component aligning jig that is one including a plurality of accommodation recesses formed in a surface thereof. When a target electronic component has a rectangular parallelepiped shape having a length L, a width W, and a thickness T, among outside surfaces of the electronic component, a surface extending along a lengthwise direction and a widthwise direction is defined as a WL surface, a surface extending along the widthwise direction and a thickness direction is defined as a WT surface, and a surface extending along the lengthwise direction and the thickness direction is defined as an LT surface, the component aligning device is configured as follows. That is, in order for one electronic component to be held in the accommodation recess with one of its WT surfaces being a top surface and with part of the electronic component protruding upward from the accommodation recess, an accommodation recess depth Z is less than the length L of the electronic component; and, in seeing the accommodation recess in plan view, if a shortest distance (which is a distance that is between opposing inner peripheral surfaces of the accommodation recess, that is greater than the thickness T, and that is the narrowest interval) is S, the condition W>S>T is satisfied. Refer to, for example, Claim 1 of Japanese Unexamined Patent Application Publication No. 2010-278153.

In Japanese Unexamined Patent Application Publication No. 2010-278153, in the accommodation recesses of the component aligning jig, in order to form a first stripe-like space and a second stripe-like space that intersect each other when seen in plan view, a plurality of protrusions that protrude towards the inside of the accommodation recesses from inner side surfaces facing the accommodation recesses of the aligning jig are formed. In addition, when the width of the first stripe-like space and the second stripe-like space is X, the relationship W>X>T is satisfied; and when the length of each stripe-like space is Y, the condition Y>W is satisfied. Refer to, for example, paragraph 0015 of Japanese Unexamined Patent Application Publication No. 2010-278153.

However, in the component aligning device in Japanese Unexamined Patent Application Publication No. 2010-278153, when an electronic chip component and a gap between an accommodation recess (in which the electronic chip component is accommodated) and the electronic chip component are increased, not only does positional displacement of the electronic chip component tend to occur, but also the electronic chip component tends to tilt. In contrast, when the gap becomes smaller, the electronic chip component cannot be efficiently transferred into the accommodation recess.

Further, as schematically shown in FIG. 13, when, as a result of entry of foreign material 52 into an accommodation recess 51 of a component aligning jig 50, an accommodated electronic chip component 60 protrudes by a large amount and is considerably tilted, a top end portion 60a of the electronic chip component 60 accommodated in the accommodation recess 51 contacts an inner peripheral surface of a through hole 71 of a guide plate 70 disposed at an upper side of the component aligning jig 50. As a result, for example, cracking and chipping tend to occur.

SUMMARY OF THE INVENTION

Accordingly, preferred embodiments of the present invention provide an aligning device that is capable of efficiently aligning alignment objects to be aligned while preventing problems such as cracking, chipping, and the like of the alignment objects, and also provide a method for efficiently producing an electronic component using the aligning device.

According to a preferred embodiment of the present invention, an aligning device includes a first transfer jig including a cavity that includes a first recess and a second recess, an alignment object to be transferred being transferred into the cavity, the first recess opening towards a principal surface, the second recess being adjacent to the first recess in a depth direction and communicating with the first recess, and a second transfer jig including a cavity that includes a first recess and a second recess, the alignment object being transferred into the cavity of the second transfer jig, the first recess of the second transfer jig opening towards a principal surface, the second recess of the second transfer jig being adjacent to the first recess of the second transfer jig in a depth direction and communicating with the first recess of the second transfer jig. In the aligning device, in plan view, the first recess of the first transfer jig has a shape and dimensions that allow an entire region of the second recess of the first transfer jig to be situated within the first recess of the first transfer jig by a predetermined interval. In addition, in plan view, the first recess of the second transfer jig has a shape and dimensions that allow an entire region of the second recess of the second transfer jig to be situated within the first recess of the second transfer jig by a predetermined interval. When the first transfer jig and the second transfer jig are caused to overlap each other, in plan view, the first recess of the second transfer jig has the shape and dimensions that allow the entire region of the second recess of the first transfer jig to be situated within the first recess of the second transfer jig by a predetermined interval. With the alignment object being transferred into the cavity of the first transfer jig, by causing the first transfer jig and the second transfer jig to overlap each other so that the principal surfaces oppose each other, the alignment object transferred into the cavity of the first transfer jig is transferred to the cavity of the second transfer jig.

In a first configuration of the aligning device, it is preferable that a bottom of the second recess of the first transfer jig includes a through hole.

By virtue of the above-described structure, it is possible to efficiently remove foreign material in the cavity of the first transfer jig by inserting a linear member, such as a metallic wire, or by blowing air through the through hole. Accordingly, it is possible to prevent the alignment object from easily cracking and chipping by preventing the alignment object from protruding from the cavity of the first transfer jig by a greater amount in proportion to the amount of reduction in the effective depth of the cavity of the first transfer jig caused by the foreign material and, thus, by preventing it from contacting another jig or the like. Thus, it is possible to increase reliability.

In a second configuration of the aligning device, it is preferable that a bottom of the second recess of the second transfer jig includes a through hole.

By virtue of the above-described structure, it is possible to, by blowing air through the through hole or inserting a linear member (such as a metallic wire), efficiently remove foreign material in the cavity of the second transfer jig and prevent a reduction in the effective depth of the cavity of the second transfer jig caused by the foreign material.

In a third configuration of the aligning device, it is preferable that, when dimensions of the alignment object are such that a thickness, a width, and a length are T, W, and L, respectively, a relationship $T<W<L$ is satisfied.

When the dimensions of the alignment object satisfy the relationship $T<W<L$, it is difficult for the alignment object to be a freestanding object at the TW surface and the alignment object tends to be accommodated in the cavity in a tilted state. However, for example, even in such a case, since, in plan view, the first recess of the second transfer jig has a shape and dimensions that allow the entire region of the second recess of the first transfer jig to be situated within the first recess of the second transfer jig by the predetermined interval, even if the top end portion of the alignment object is somewhat exposed from the cavity of the first transfer jig, it is possible to prevent, for example, cracking and chipping of the alignment object caused by collision of the alignment object with an inner peripheral surface of the cavity of the second transfer jig (more specifically, the first recess) of the second transfer jig. This is particularly significant and advantageous.

According to a fourth configuration of the aligning device, it is desirable that the alignment object be a multilayer structure in which a ceramic layer and an internal electrode are disposed upon each other, the multilayer structure being formed by a process for producing a multilayer ceramic capacitor.

A multilayer structure (e.g., ceramic capacitor element) in which an internal electrode and a ceramic layer formed in a process for producing a multilayer ceramic capacitor are disposed upon each other tends to be, for example, cracked and chipped. Therefore, when the aligning device according to a preferred embodiment of the present invention is used to transfer such a multilayer structure, it is possible to transfer and align the multilayer structure without damaging it. When the multilayer structure is unfired, the tendency with which the multilayer structure becomes cracked and chipped is increased. However, even in such a case, it is possible to transfer and align the multilayer structure without cracking and chipping the multilayer structure. This is particularly significant and advantageous.

According to a fifth configuration of the aligning device, it is preferable that the second transfer jig include a first plate member including a through hole that defines a first recess of the second transfer jig, and a second plate member which is used to overlap the first plate member, which includes the second recess of the second transfer jig in cooperation with the first recess of the second transfer jig to define the cavity of the second transfer jig, and which is separable from the first plate member.

When, as the second transfer jig, a jig including a first plate member and a second plate member such as that described above is used, for example, application is easily made to a complicated structure in which fabrication of the second transfer jig is facilitated and costs are reduced.

According to another preferred embodiment of the present invention, a method for producing an electronic component uses the aligning device according to any one of the first to fifth configurations described above. The method includes the steps of transferring the alignment object into the cavity of the first transfer jig, and transferring the alignment object transferred into the cavity of the first transfer jig into the cavity of the second transfer jig by causing the first transfer jig and the second transfer jig to overlap each other so that the principal surfaces oppose each other.

The method for producing an electronic component preferably further includes the steps of holding the alignment object transferred in the cavity of the second transfer jig by an adhesive holding jig by pushing the alignment object transferred into the cavity of the second transfer jig against the adhesive holding jig, and immersing the alignment object held by the adhesive holding jig in a paste.

When the above-described steps are included in the method, it is possible to efficiently produce an electronic component that is produced by performing the step of forming an external electrode by applying a conductive paste. This allows a method according to a preferred embodiment of the present invention to be more effective.

In the method for producing an electronic component, it is preferable that the second transfer jig includes a first plate member including a through hole that defines the first recess of the second transfer jig, and a second plate member which is used to overlap the first plate member, which includes the second recess of the second transfer jig in cooperation with the first recess of the second transfer jig to form the cavity of the second transfer jig, and which is separable from the first plate member, and that the method further includes the step of, prior to holding the alignment object by the adhesive holding jig, causing the alignment object to protrude from the second recess of the second plate member that defines a portion of the cavity of the second transfer jig by separating the first plate member from the second plate member.

By using the second transfer jig having the above-described structure, it is possible to provide the following structure. That is, in the structure, the depth and shape of the recess (cavity) of the second transfer jig in which the electronic component at the time of transfer is transferred, differ from the depth and size of the recess (second recess of the second transfer jig) in which the electronic component at the time that the alignment object is held by the adhesive holding jig is transferred. In this case, for example, the entire electronic component is accommodated in the recess (cavity) of the second transfer jig until the alignment object is held by the adhesive holding jig. When the alignment object is held by the adhesive holding jig, the top end portion of the electronic component is caused to be exposed (to protrude) for the first time. This makes it possible to, for example, reduce the possibility of damaging the electronic component.

In the method for producing an electronic component, for example, the following are examples of an alignment object for the case in which the electronic component is a ceramic electronic component such as a multilayer ceramic capacitor. Such examples are an unfired ceramic multilayer structure and a fired ceramic multilayer structure prior to forming an external electrode after the firing. However, the examples of the alignment object are not limited thereto. Various other alignment objects may be used.

Aligning devices according to various preferred embodiments of the present invention preferably has the structure described above. When the first transfer jig and the second transfer jig are caused to overlap each other, in plan view, the first recess of the second transfer jig has a shape and dimensions that allow the entire region of the second recess of the first transfer jig to be situated within the first recess of the second transfer jig by the predetermined interval (margin).

Therefore, for example, even if, due to foreign material (such as a broken piece of an alignment object to be aligned), the effective depth of a cavity of a first transfer jig is reduced and a top end portion of the alignment object is held in an exposed state from the cavity and in a tilted state, it is possible to prevent cracking, chipping, and the like of the alignment object by preventing the top end portion of the alignment object protruding from the cavity of the first transfer jig from contacting an inner peripheral surface of the first recess of the cavity of the second transfer jig.

Methods for producing an electronic component according to various preferred embodiments of the present invention include a method for producing an electronic component using the aligning device according to any of the first to fifth configurations of various preferred embodiments of the present invention. According to an example method, after transferring the alignment object to the cavity of the second transfer jig, foreign material in the cavity of the first transfer jig is removed by blowing air or inserting a linear member (whose cross sectional area is less than an opening area of the through hole) into the through hole formed in a bottom surface of the second recess of the cavity of the first transfer jig. Therefore, even if foreign material, such as a broken piece of the alignment object, enters the cavity of the first transfer jig, it is possible to remove the foreign material and reliably transfer the alignment object to a position where its bottom end portion reaches the bottom surface of the cavity of the first transfer jig. As a result, it is possible to reliably align the alignment object without cracking and chipping of the alignment object caused by contact of the top end portion of the alignment object with, for example, another jig. Accordingly, it is possible to efficiently produce the electronic component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments according to the present invention are described by describing in further detail the features of the present invention.

Figure 1A:
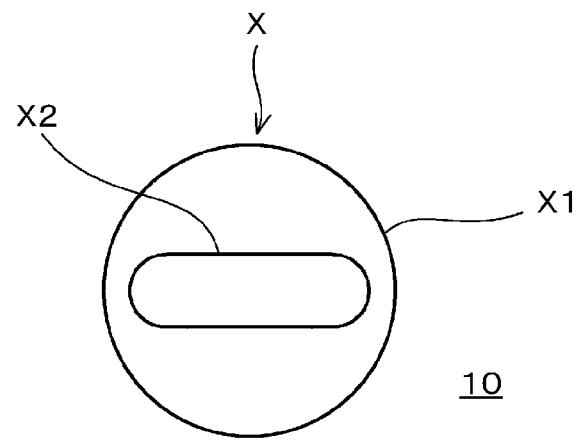
FIGS. 1A and 1B each illustrate a structure of a first transfer jig of an aligning device according to a preferred embodiment of the present invention, with FIG. 1A being a plan view of a structure of, for example, a cavity of the first transfer jig and FIG. 1B being a front sectional view thereof.
Figure 1B:
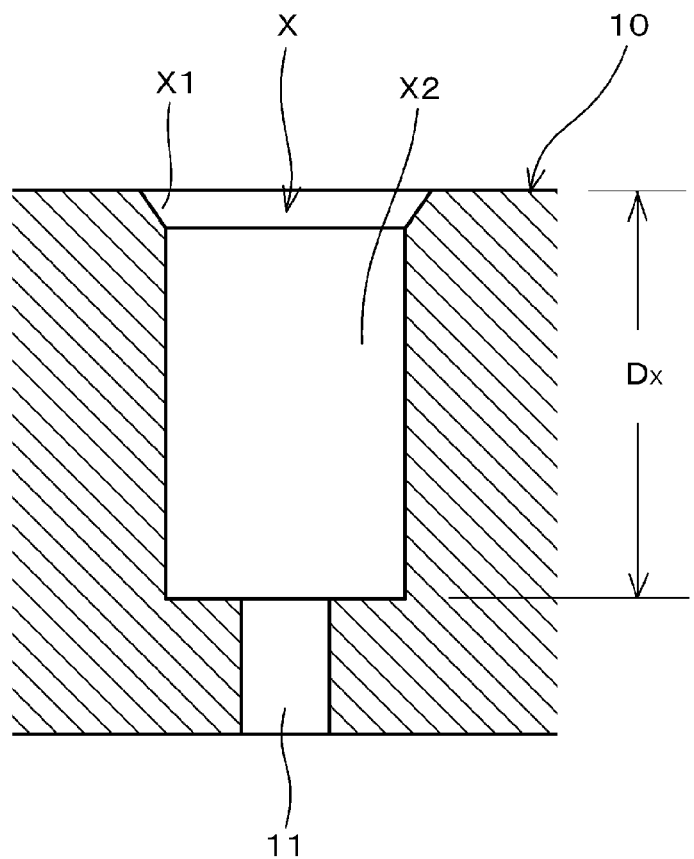
Figure 2A:
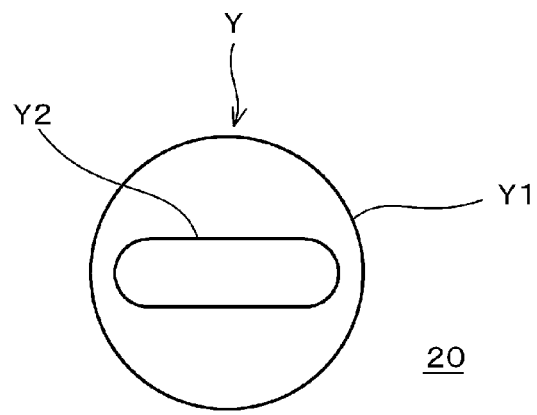
FIGS. 2A and 2B each illustrate a structure of a second transfer jig of the aligning device according to a preferred embodiment of the present invention, with FIG. 2A being a plan view of a structure of, for example, a cavity of the second transfer jig and FIG. 2B being a front sectional view thereof.
Figure 2B:
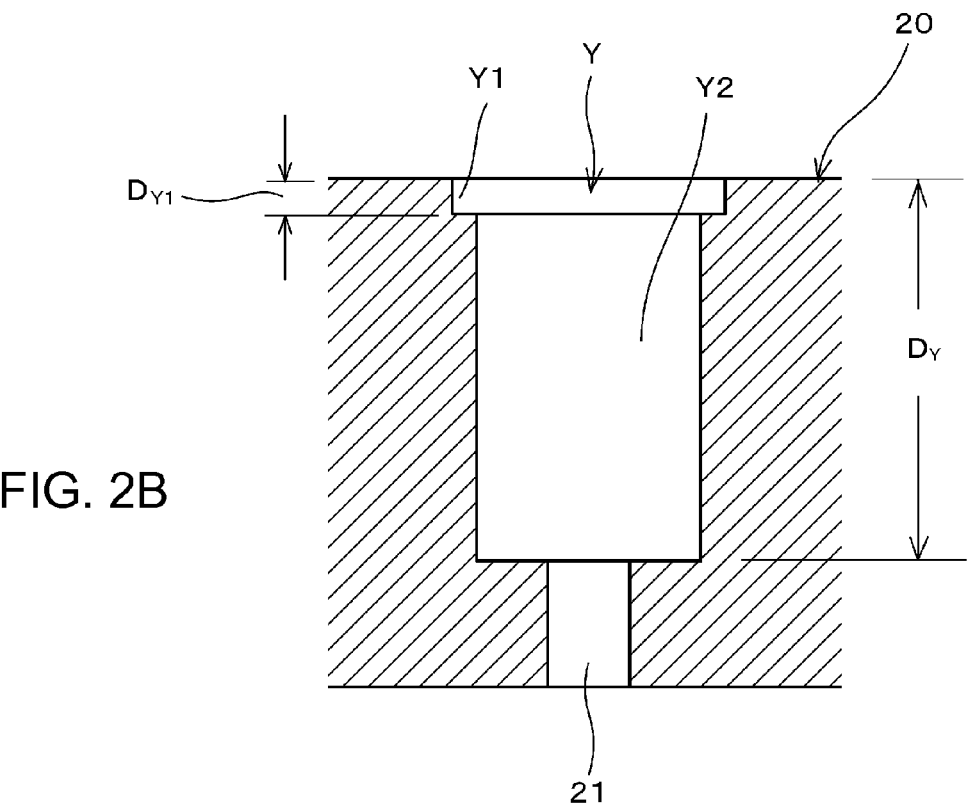

FIGS. 1A and 1B each illustrate a structure of a first transfer jig 10 of an aligning device according to a preferred embodiment of the present invention. FIGS. 2A and 2B each illustrate a structure of a second transfer jig 20.

Figure 3:
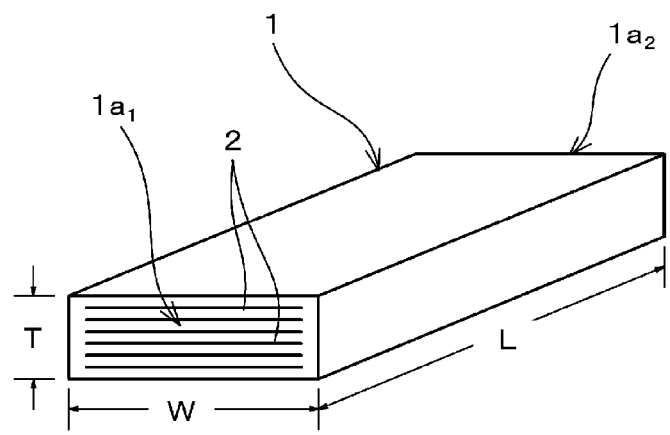
FIG. 3 is a perspective view of a structure of an alignment object that is transferred and aligned using an aligning device according to a preferred embodiment of the present invention.

FIG. 3 is a perspective view of an alignment object (chip) 1 that is transferred and aligned using an aligning device according to a preferred embodiment of the present invention.

In this preferred embodiment, when, as shown in FIG. 3, the thickness, the width, and the length of the alignment object (chip) 1 that is transferred and aligned are T, W, and L, respectively, the alignment object 1 preferably has a rectangular or substantially rectangular parallelepiped shape in which T is approximately 0.15 to approximately 0.10 mm, W is approximately 0.5 mm, and L is approximately 1.0 mm, and the relationship T<W<L is satisfied, for example.

In this preferred embodiment, the alignment object (chip) 1 that is transferred and aligned preferably is a ceramic multilayer structure (multilayer ceramic capacitor element) that is formed by performing a process of producing a multilayer ceramic capacitor. The alignment object 1 has a structure in which internal electrodes 2 that are adjacent to each other in a stacking direction are alternately drawn out at opposing end surfaces (WT surfaces) $1a_1$ and $1a_2$.

The chip (multilayer ceramic capacitor element) 1 is one in which, after the transfer and alignment steps performed using the aligning device according to a preferred embodiment, a pair of external electrodes are arranged at the end surfaces $1a_1$ and $1a_2$ so as to be brought into conduction with the internal electrodes 2 drawn out from the opposing end surfaces $1a_1$ and $1a_2$. The chip 1 is used so that, in an unfired state, the multilayer ceramic capacitor in which conductive paste for forming the external electrodes applied to the end surfaces is fired is formed.

The aligning device according to this preferred embodiment used to transfer and align such an alignment object 1 includes 1) the first transfer jig 10 shown in FIGS. 1A and 1B including a cavity (accommodation recess) X into which the alignment object 1 to be transferred is transferred, and 2) the second transfer jig 20 shown in FIGS. 2A and 2B including a cavity (accommodation recess) Y into which the alignment object 1 is transferred.

In this preferred embodiment, the first transfer jig 10 is preferably made of a resinous material, and the second transfer jig 20 is preferably made of a metallic material, for example. However, materials used to form the jigs are not limited thereto, so that other materials may also be used.

The cavity (accommodation recess) X of the first transfer jig 10 preferably is configured in a matrix over the entire surface of the first transfer jig 10. In addition, the cavity (accommodation recess) Y of the second transfer jig 20 is preferably configured in a matrix over the entire surface of the second transfer jig 20.

A pin (not shown) that engages with an engagement recess in a peripheral portion of the second transfer jig 20 is provided at a peripheral portion of the first transfer jig 10, so that positioning of the first transfer jig 10 with the second transfer jig 20 is facilitated.

As shown in FIGS. 1A and 1B, the cavity X of the first transfer jig 10 includes a first recess X1 and a second recess X2. The first recess X1 opens towards a principal surface. The second recess X2 is adjacent to the first recess X1 in a depth direction and communicates with the first recess X1.

The first recess X1 of the cavity X is configured preferably so as to have a substantially tapering inclined configuration and a substantially mortar-shaped configuration so as to facilitate the transfer of the alignment object 1, for example.

The planar shape of the second recess X2 preferably has a substantially strip-shaped configuration whose both ends are rounded, for example. In the present preferred embodiment, the second recess X2 is configured so as to transfer a thin alignment object 1, which is to be transferred, in a predetermined orientation into the second recess X2.

A through hole 11 that allows foreign material that has entered the first transfer jig 10 to drop therein is provided in a bottom of the second recess X2 of the first transfer jig 10. Foreign material that does not easily pass through the through hole 11 may be easily removed by, for example, blowing in air or inserting a thin wire or the like and scraping out the foreign material. In the present preferred embodiment, foreign material is easily removed by inserting a thin wire.

The first recess X1 of the first transfer jig 10 has, in plan view, a shape and dimensions that allow the entire region of the second recess X2 to be situated within the first recess X1 by a predetermined interval (margin).

In this preferred embodiment, a depth $D_X$ of the cavity X of the first transfer jig 10 is a depth that allows a top end portion of the alignment object 1 to be exposed (to protrude) when the alignment object 1 is transferred with a WT surface being a top surface. That is, the depth $D_X$ is a dimension that is less than a length L of the alignment object. It is desirable that the depth $D_X$ of the cavity X of the first transfer jig 10 be a depth that allows the entire alignment object 1 to be accommodated when the alignment object 1 is transferred with a WT surface being a top surface. That is, it is desirable that the depth $D_X$ be greater than or equal to the length L of the alignment object.

In this case, when the alignment object 1 satisfies the relationship T<W<L, in particular, when the alignment object 1 is a thin object whose thickness T is less than or equal to half of W and L, it is possible to efficiently transfer the alignment object 1 to the first transfer jig 10 while suppressing and preventing cracking and chipping of the alignment object 1.

However, when the alignment object 1 is accommodated in a depth that allows the entire alignment object 1 to be accommodated, it becomes difficult to push the alignment object 1 against an adhesive holding jig 40 (described below) and hold the alignment object by the adhesive holding jig 40. Therefore, in the present preferred embodiment of the present invention, the alignment object 1 is transferred to the second transfer jig 20.

As shown in FIGS. 2A and 2B, the cavity Y of the second transfer jig 20 includes a first recess Y1 and a second recess Y2. The first recess Y1 opens towards a principal surface. The second recess Y2 is adjacent to the first recess Y1 in a depth direction and communicates with the first recess Y1. That is, in the second transfer jig 20, a member that defines the first recess Y1 and a member that defines the second recess Y2 are integrated with each other.

Figure 2C:
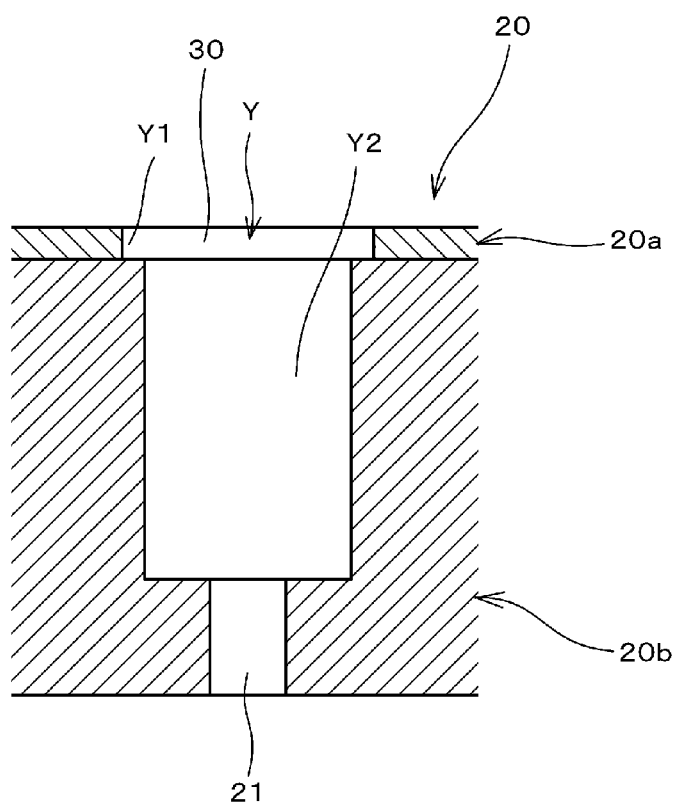
FIG. 2C illustrates a modification of the second transfer jig of the aligning device according to the preferred embodiment of the present invention.

However, as shown in FIG. 2C, the second transfer jig 20 may include a first plate member 20a and a second plate member 20b. The first plate member 20a includes a through hole that defines the first recess Y1. The second plate member 20b is used so as to overlap the first plate member 20a, includes the second recess Y2, and is separable from the first plate member 20a. The recess Y2 forms the cavity Y in cooperation with the recess Y1. In FIG. 2A, portions that are labelled with the same reference numerals as those in FIGS. 2A and 2B are the same or corresponding portions.

As described below, in order to allow the alignment object 1 to be adhesively held by the adhesive holding jig, a depth $D_Y$ of the cavity Y of the second transfer jig is a depth that allows the top end portion of the alignment object 1 that cannot be completely accommodated to be exposed (to protrude) when the alignment object 1 is accommodated with its WT surface being a top surface. That is, the depth $D_Y$ is a dimension that is less than the length L of the alignment object.

As described above, when the second transfer jig 20 is one including the first plate member 20a and the second plate member 20b that is separable from the first plate member 20a, the depth of the second recess Y2 is a depth that allows the top end portion of the alignment object 1 to be exposed (to protrude) from a top surface of the second plate member 20b when the first plate member 20a is separated from the second plate member 20b. That is, the depth of the second recess Y2 is less than the length L of the alignment object 1.

The first recess Y1 of the cavity (accommodation recess) Y has a diameter that is greater than the maximum dimension of the second recess Y2 defined by a disc-shaped or substantially disc-shaped space (that is, a circular or substantially circular cylindrical space having a low height). That is, in plan view, the first recess Y1 of the second transfer jig 20 has a shape and dimensions that allow the entire region of the second recess Y2 to be situated within the first recess Y1 by a predetermined interval.

The second recess Y2 preferably has a strip-shaped or substantially strip-shaped configuration with both ends rounded in plan view, for example. In the present preferred embodiment, the second recess Y2 is configured so as to allow the thin alignment object 1, which is transferred, to be held in a predetermined orientation.

A through hole 21 is provided in a bottom of the second recess Y2 of the second transfer jig 20. Accordingly, even if foreign material enters the second recess Y2, the foreign material is easily removed by, for example, blowing gas from the through hole 21 or inserting a thin wire or the like and scraping out the foreign material.

In plan view, the first recess Y1 of the second transfer jig 20 has a shape and dimensions that allow the entire region of the second recess Y2 to be situated within the first recess Y1 by a predetermined interval.

A depth $D_{Y1}$ of the first recess Y1 of the second transfer jig 20 is greater than the thickness T (which preferably is approximately 0.15 mm, for example, in the present preferred embodiment) of the alignment object 1.

Here, the depth $D_{Y1}$ of the first recess Y1 of the second transfer jig 20 is greater than the thickness of the alignment object 1 in order to prevent the alignment object 1 and the second transfer jig 20 from interfering with each other when the alignment object 1 is transferred.

In the aligning device according to the present preferred embodiment, the first transfer jig 10 and the second transfer jig 20 are caused to overlap each other so that the principal surfaces oppose each other (desirably, contact each other), and are in a predetermined positional relationship. When, in this state, for example, vibration is applied, it is possible to transfer the alignment object 1 that has been transferred to the cavity X of the first transfer jig 10 into the cavity Y of the second transfer jig 20.

Next, a non-limiting example of a method for transferring and aligning chips using the transferring device and a method for applying a conductive paste for forming external electrodes at the aligned chips are described with reference to FIGS. 4 to 12, which are schematic views.

Figure 4:
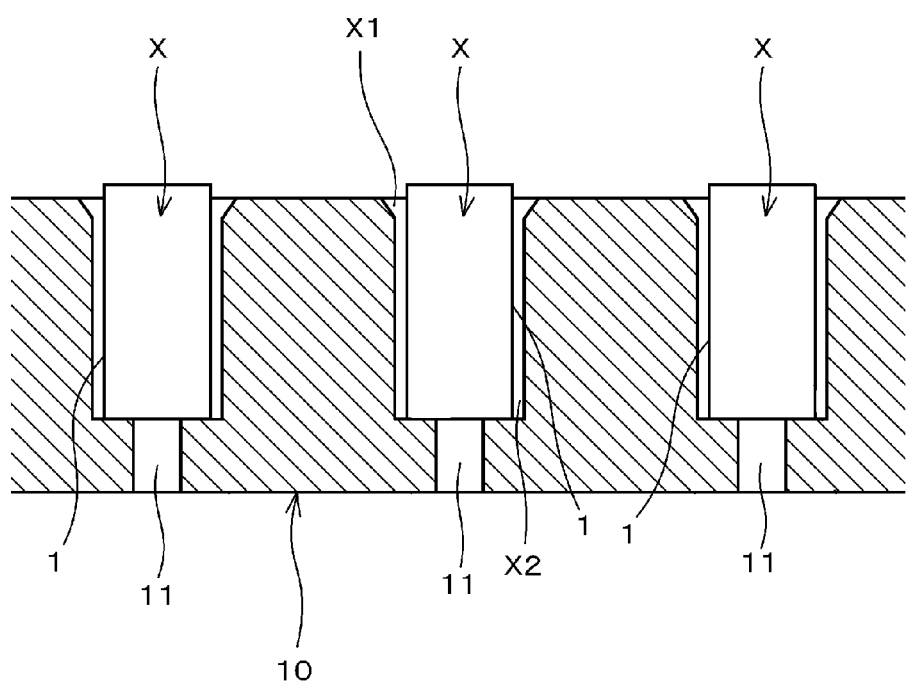
FIG. 4 illustrates a method for aligning alignment objects using the aligning device according to a preferred embodiment of the present invention, in which the alignment objects are transferred in the cavities of the first transfer jig.

(1) First, by setting the first transfer jig 10 at a vibratory device that is capable of applying a predetermined rotation and vibration, and by applying the rotation and vibration, alignment objects 1 are transferred into cavities X of the first transfer jig 10 as shown in FIG. 4.

Figure 5:
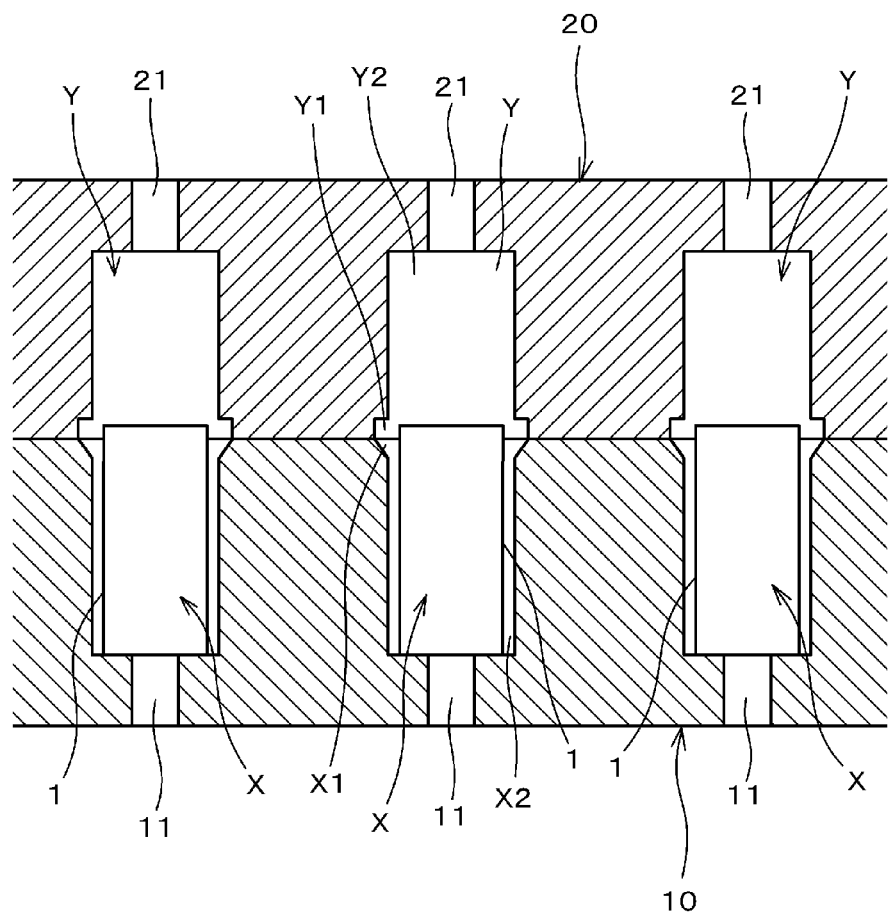
FIG. 5 illustrates a state in which the second transfer jig is caused to overlap the first transfer jig in the state shown in FIG. 4.

(2) As shown in FIG. 5, the second transfer jig 20 is caused to overlap the first transfer jig 10 so that the cavities X and cavities Y oppose each other. At this time, the first transfer jig 10 and the second transfer jig 20 are positioned by engaging the pin (not shown) of the first transfer jig 10 with the engagement recess (not shown) of the second transfer jig 20.

Figure 6:
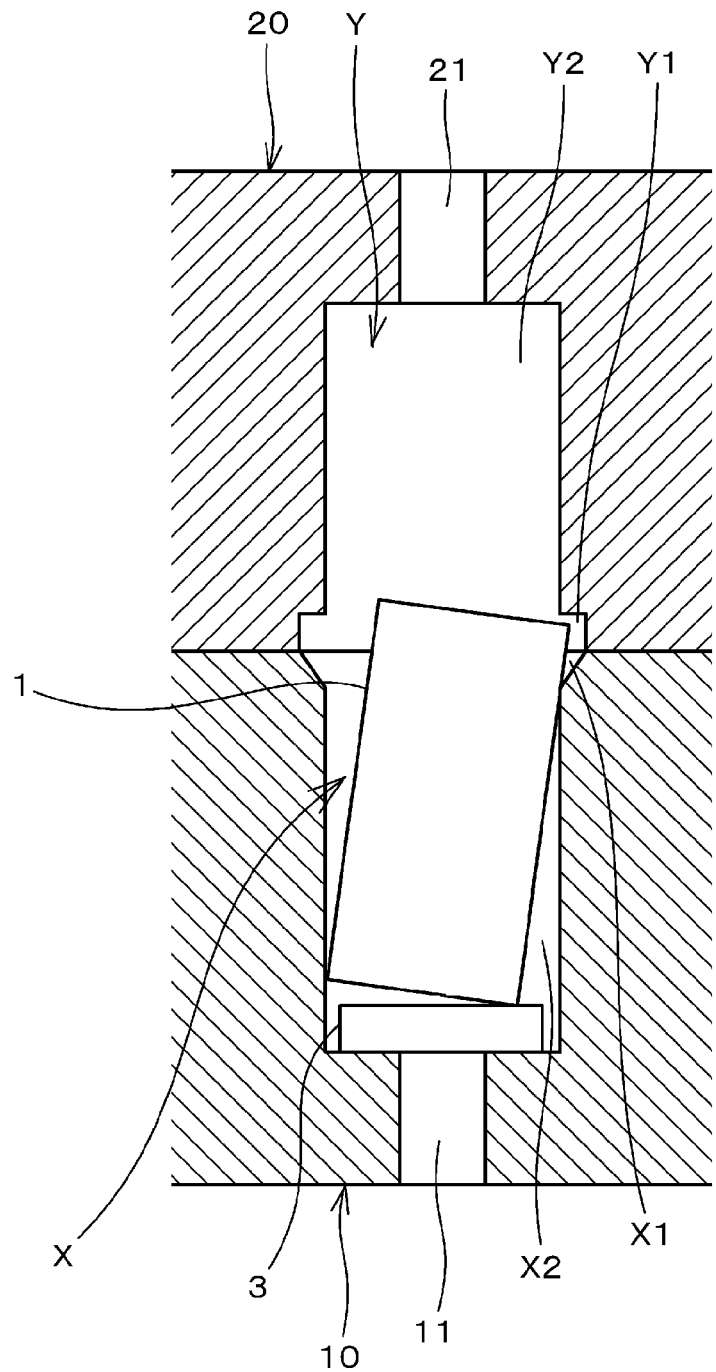
FIG. 6 illustrates operation effects according to a preferred embodiment of the present invention in the state shown in FIG. 5 in which the second transfer jig is caused to overlap the first transfer jig.

At this time, the cavities Y of the second transfer jig 20 are provided with first recesses Y1. As described above, the diameters of the first recesses Y1 are greater than maximum dimensions of the second recesses Y2 at disc-shaped or substantially disc-shaped spaces (that is, circular or substantially circular cylindrical spaces having low heights). (That is, in plan view, the first recesses Y1 have shapes and dimensions that allow the entire regions of the second recesses Y2 to be situated within the first recesses Y1.) In addition, at this time, in plan view, the first recesses Y1 of the second transfer jig 20 have shapes and dimensions that allow the entire regions of the second recesses X2 of the first transfer jig 10 to be situated within the first recesses Y1 by predetermined intervals. Therefore, as shown in FIG. 6, even if foreign material (such as broken pieces of the alignment objects 1 or the like) enter bottom portions of the cavities X of the first transfer jig 1 and top end portions of the alignment objects 1 protrude (are exposed) from the cavities X, it is possible to reliably prevent, for example, cracking and chipping of the alignment objects 1 caused by collision of the top end portions of the alignment objects 1 with inner peripheral surfaces of the cavities Y of the second transfer jig 20. That is, the diameters of the first recesses Y1 of the cavities Y of the second transfer jig 20 are greater than the maximum dimensions of the second recesses Y2 in a plane. Therefore, it is possible to efficiently align the alignment objects 1 by preventing collision of the top end portions of the alignment objects 1 with the inner peripheral surfaces of the cavities Y and cracking, chipping, and the like of the alignment objects 1. For example, such collision, cracking, chipping, and the like may occur in the case shown in FIG. 7 in which the first recesses Y1 do not exist.

Figure 8A:
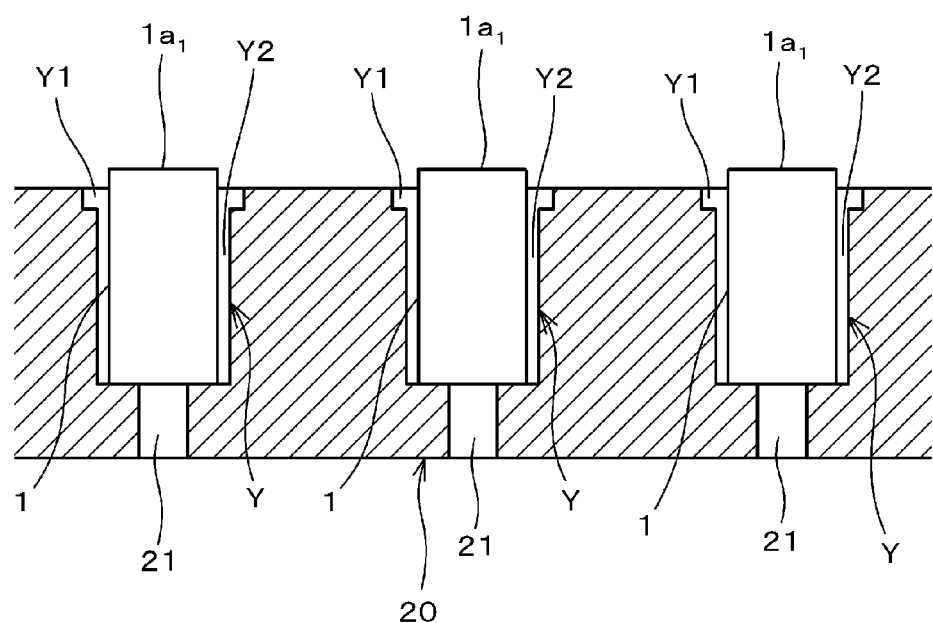
FIG. 8A illustrates a method for producing an electronic component using the aligning device according to a preferred embodiment of the present invention, in which the first transfer jig is removed after being reversed.

(3) Then, in order to reverse the positional relationship between the first transfer jig 10 and the second transfer jig 20 in the vertical direction, the first transfer jig 10 and the second transfer jig 20 are reversed through an angle of 180 degrees. In the reversed state, vibration is applied to transfer the alignment objects 1 from the cavities X of the first transfer jig 10 to the cavities Y of the second transfer jig 20. Then, the first transfer jig 10 is removed, and, as shown in FIG. 8A, the alignment objects 1 are transferred into the cavities Y of the second transfer jig with their top end portions being exposed from the cavities Y.

Figure 8B:
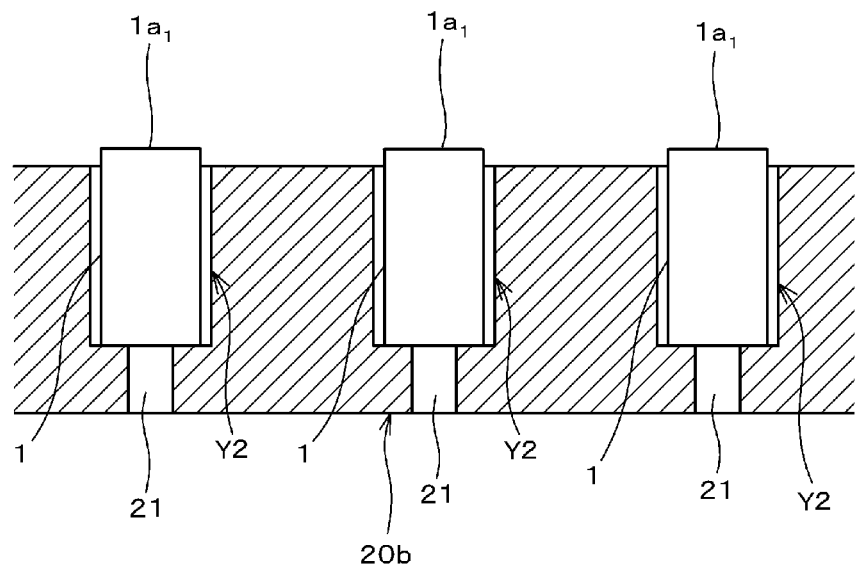
FIG. 8B illustrates a state in which, when the second transfer jig according to the modification (FIG. 2C) is used, top end portions of the alignment objects are exposed (protrude) from second recesses of second plate members.

When, as described above, the second transfer jig 20 is one including first plate members 20a and second plate members 20b that are separable from the first plate members 20a (see FIG. 2C), it is assumed that the first plate members 20a are separated from the second plate members 20b, so that, as shown in FIG. 8B, the top end portions of the alignment objects 1 are exposed (protrude) from the second recesses Y2 of the second plate members 20b.

In FIG. 8B, portions that are labelled with the same reference numerals as those in FIGS. 2A and 2B are the same or corresponding portions.

Then, from the bottom of the first transfer jig 10 that has been removed, thin wires or the like are inserted into the through holes formed at the bottom portions of the cavities X, to remove foreign material that has entered the cavities X.

Then, preparation is made for the next transfer step. Instead of inserting thin wires into the through holes, it is possible to blow air to remove the foreign material from the cavities X.

Figure 9A:
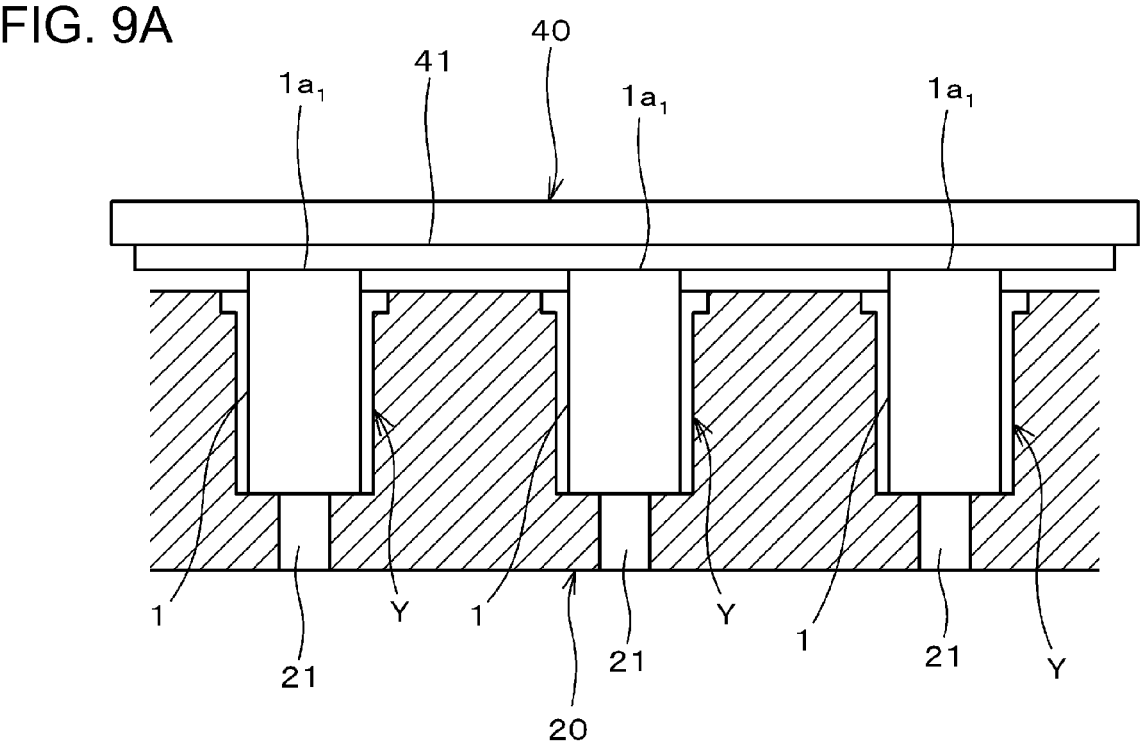
FIG. 9A illustrates the method for producing an electronic component using the aligning device according to a preferred embodiment of the present invention, in which an adhesive holding jig including an adhesive material is pushed against the alignment objects and the alignment objects are held by the adhesive material of the adhesive holding jig.
Figure 10:
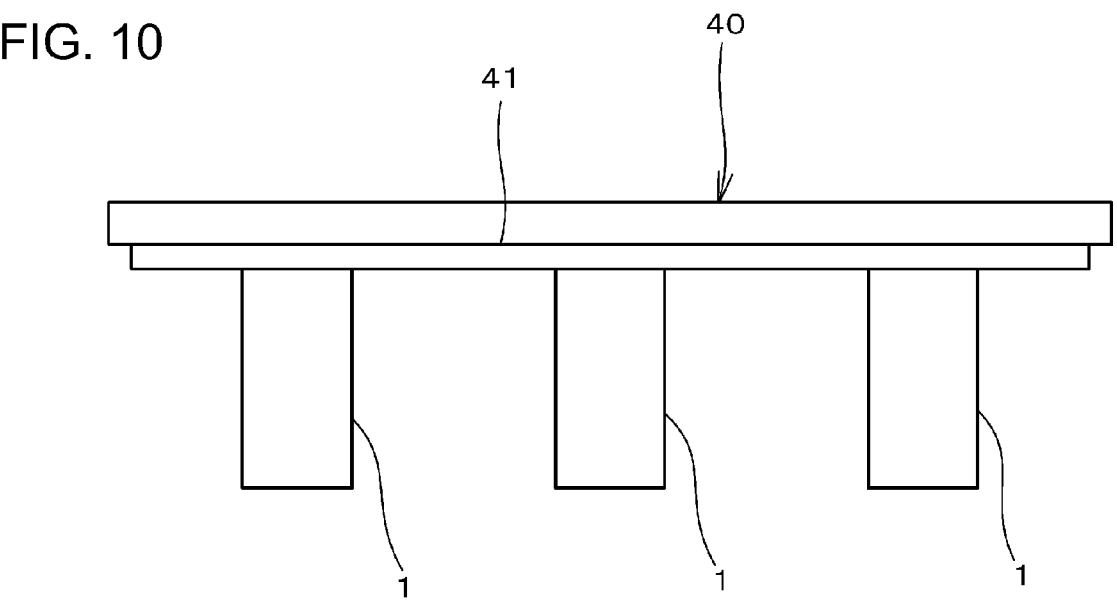
FIG. 10 illustrates the method for producing an electronic component using the aligning device according to a preferred embodiment of the present invention, in which the alignment objects are transferred to the adhesive holding jig by separating the adhesive holding jig and the second transfer jig from each other.

(4) Next, as shown in FIG. 9A, an adhesive holding jig 40 including an adhesive material 41 (which preferably is a sheet material having viscosity, for example) is pushed against the alignment objects 1, and one of the WT surfaces $1_{a1}$ of each alignment object 1 is held by the adhesive material 41 of the adhesive holding jig 40. Then, as shown in FIG. 10, the adhesive holding jig 40 and the second transfer jig 20 are separated from each other to transfer the alignment objects 1 to the adhesive holding jig 40.

Figure 9B:
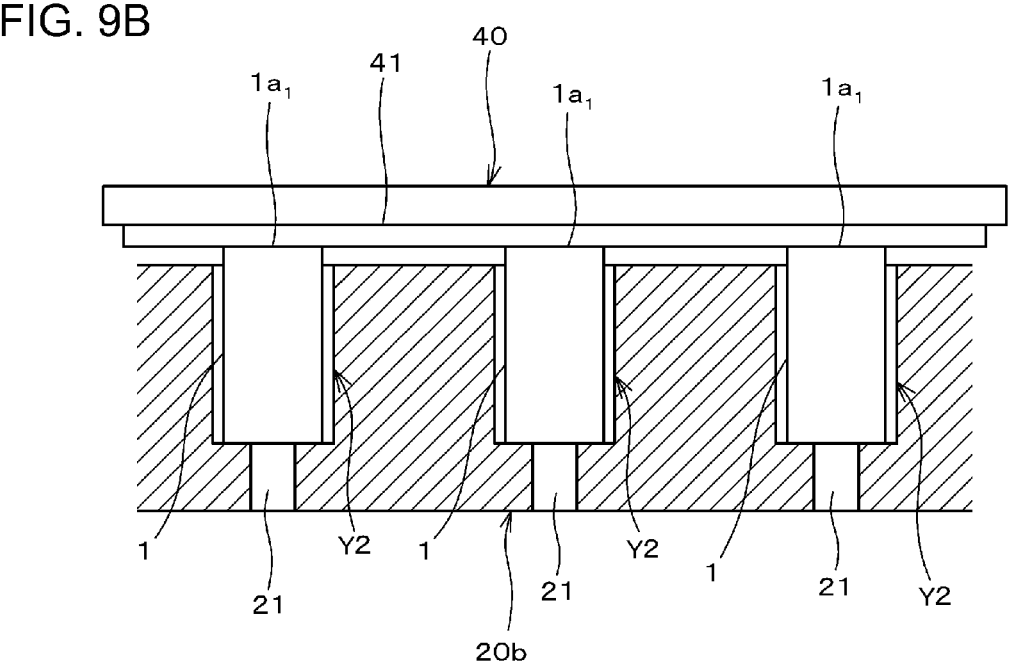
FIG. 9B illustrates a state in which the alignment objects are held by the adhesive material of the adhesive holding jig when the second transfer jig according to the modification (FIG. 2C) is used.

When the second transfer jig 20 is one including first plate members 20a and second plate members 20b that are separable from the first plate members 20a (see FIG. 2C), as shown in FIG. 9B, it is possible to similarly transfer the alignment objects 1 to the adhesive holding jig 40 by pushing the adhesive holding jig against the alignment objects 1 exposed from the second recesses Y2 of the second plate member 20b. In FIG. 9B, portions that are labelled with the same reference numerals as those in FIGS. 2A and 2B are the same or corresponding portions.

The adhesive material 41 is a sheet adhesive material having adhesive strength and elasticity that allow the alignment objects 1 to be held. Various other materials that allow the alignment objects 1 to be adhesively held may be used as the adhesive material 41.

Figure 11:
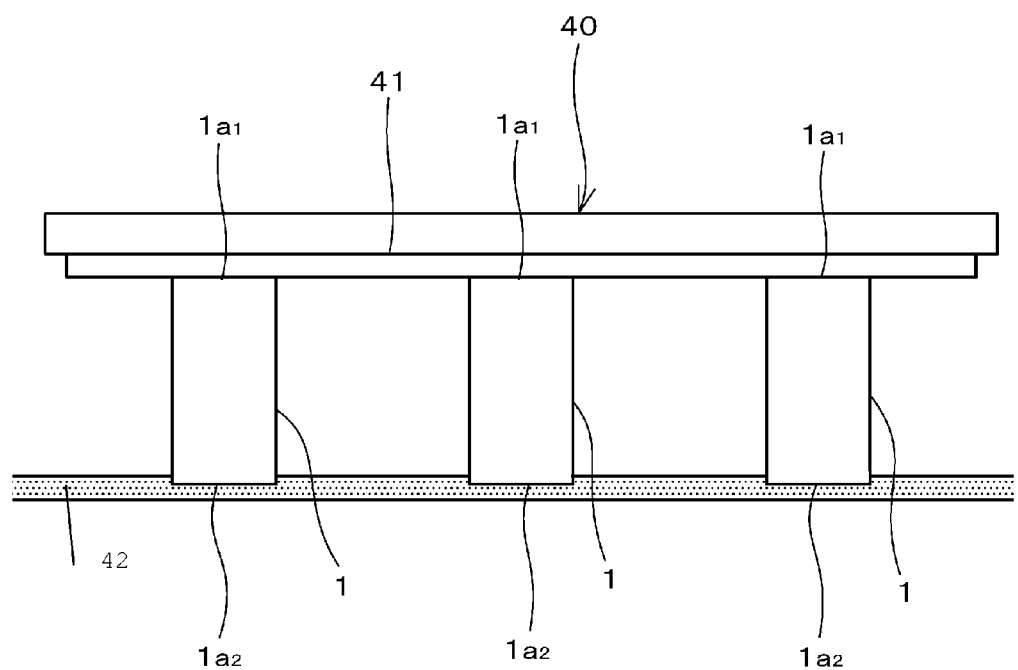
FIG. 11 illustrates the method for producing an electronic component using the aligning device according to a preferred embodiment of the present invention, in which end portions of the alignment objects are immersed in a conductive paste layer.
Figure 12:
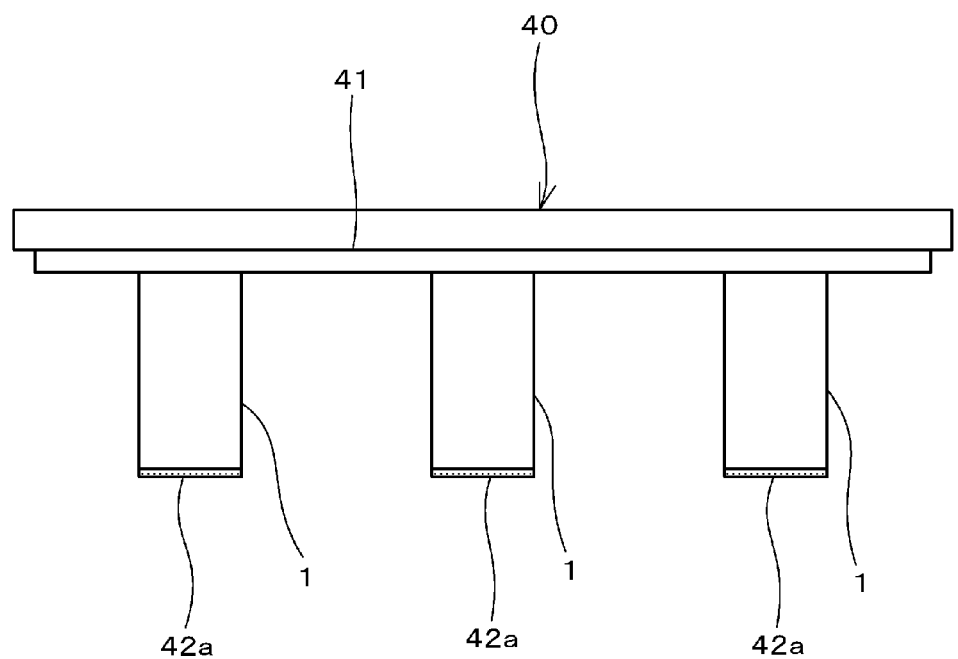
FIG. 12 illustrates the method for producing an electronic component using the aligning device according to a preferred embodiment of the present invention, in which the conductive paste is adhered to the end portions of the alignment objects.
Figure 13:
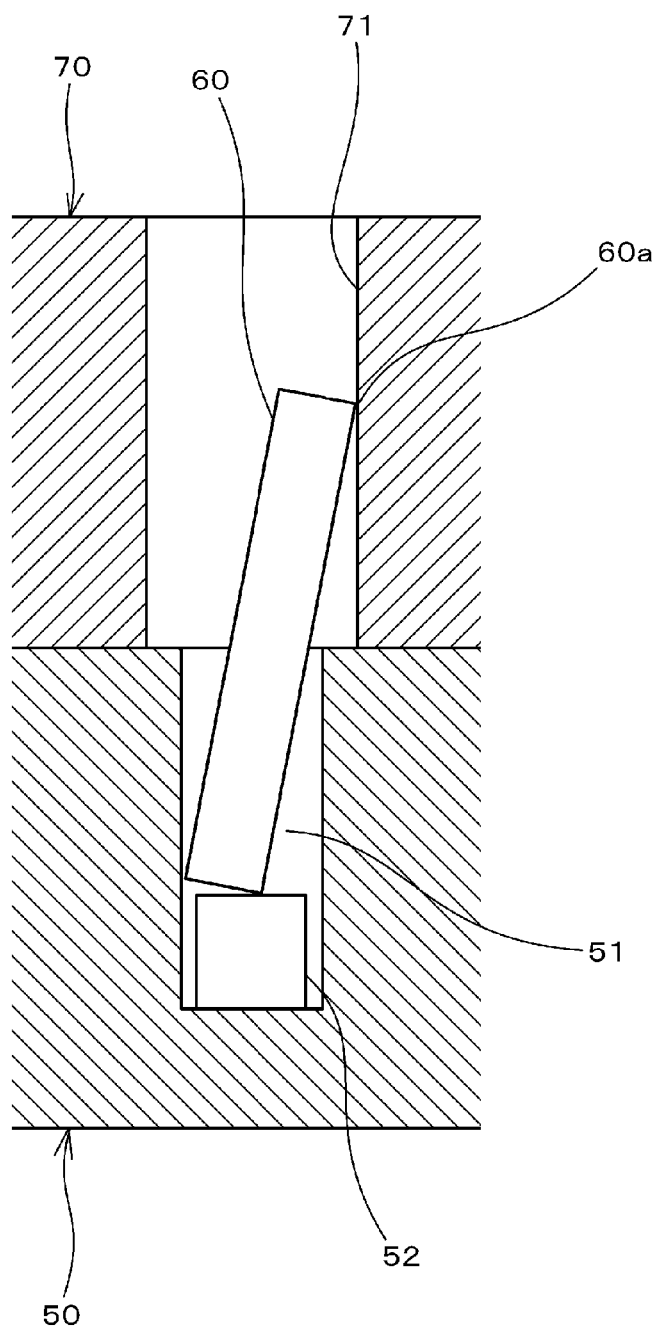
FIG. 13 illustrates a problem in an existing aligning device.

(5) Next, as shown in FIG. 11, after immersing the other WT surface 1a2 of each alignment object 1 held by the adhesive holding jig 40 in a conductive paste layer 42, the alignment objects 1 are raised to cause the conductive paste 42a to adhere to the other WT surface 1a2 of each alignment object 1 and side surfaces near the other WT surface 1a2 as shown in FIG. 12.

(6) Then, as shown in FIG. 12, with the alignment objects 1 being held by the adhesive holding jig 40, the adhered conductive paste is dried.

(7) Thereafter, although not particularly illustrated, the other WT surface 1a2 of each alignment object 1 to which the conductive paste 42a has been applied is adhesively held by an adhesive holding jig using an adhesive material having an adhesive force that is higher than that of the adhesive material 41 of the adhesive holding jig 40 used in (4) above, and the alignment objects 1 are transferred. By performing the steps according to (5) and (6) above, conductive paste is adhered to the WT surface 1a1 of each alignment object 1 and the side surfaces near the WT surface 1a1.

(8) Then, the chips are removed from the adhesive holding jig. Thereafter, a co-firing step in which, under a predetermined condition, firing of an unfired ceramic multilayer structures (alignment objects) and sintering of the conductive paste (external electrodes) are performed at the same time is performed. This causes, for example, the ceramic to be fired and the external electrodes to be formed at the same time.

Then, by plating the external electrodes, a multilayer ceramic capacitor having a structure in which the external electrodes that are brought into conduction with internal electrodes are formed at opposing end surfaces of the chips.

Figure 7:
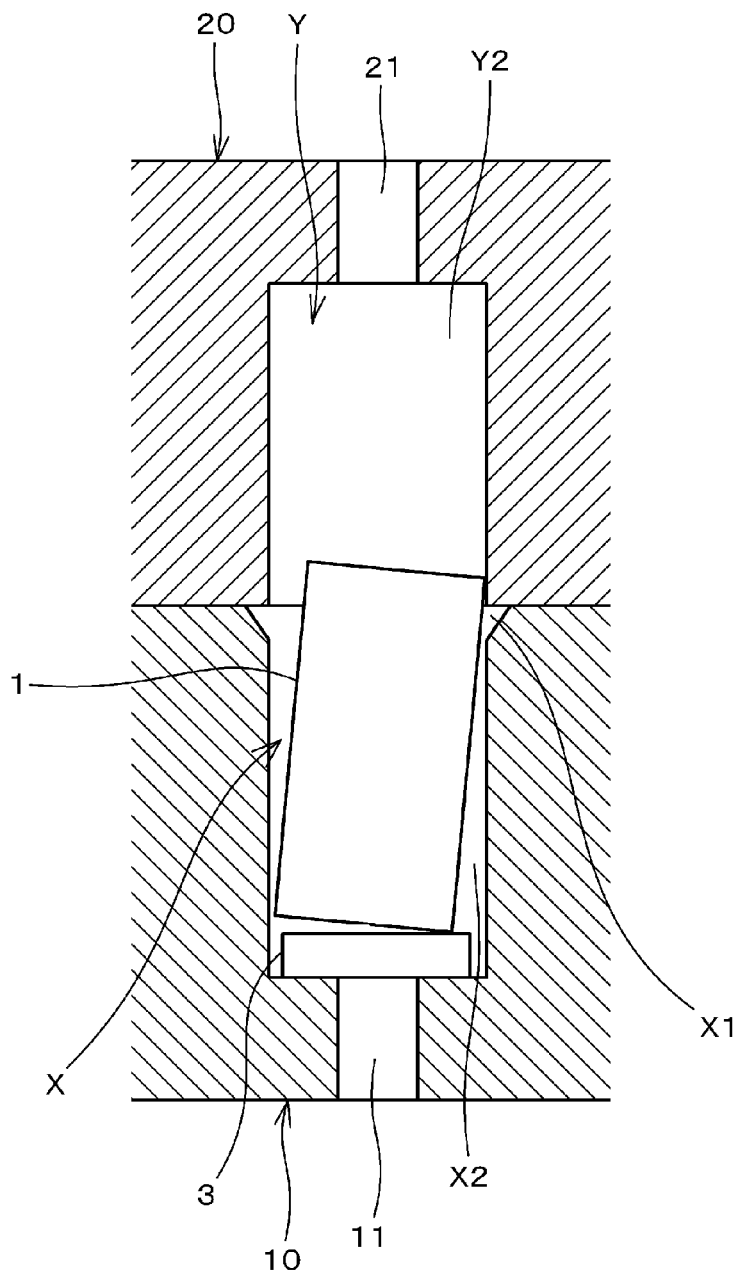
FIG. 7 illustrates a structure of a comparative example used to describe the operation effects according to various preferred embodiments of the present invention (that is, an aligning device according to a comparative example that does not include the features according to the present invention).

As described above, the frequency of occurrences of cracking, chipping, and the like were checked when alignment objects were transferred and aligned using the aligning device according to the above-described preferred embodiments of the present invention shown in FIG. 6 and the aligning device not including the first recesses Y1 shown in FIG. 7 (that is, the aligning device according to the comparative example not including the features of the present invention).

The results show that, when the aligning device according to the comparative example not including the features of various preferred embodiments of the present invention (FIG. 7) was used, cracking, chipping, and the like occurred in a few alignment objects per 100,000 alignment objects that were aligned. In contrast, when the aligning device according to preferred embodiments of the present invention (FIG. 6) was used, no cracking, chipping, and the like were observed in 100,000 alignment objects that were transferred and aligned.

From these results, it was confirmed that the aligning devices having the structure according to preferred embodiments of the present invention efficiently align the alignment objects while preventing cracking, chipping, and the like of the alignment objects.

In the above-described preferred embodiments, the case in which the planar shapes of the second recesses X2 of the first transfer jig 10 and the second recesses Y2 of the second transfer jig 20 preferably are strip-shaped or substantially strip-shaped configurations whose both ends are rounded is described. However, the planar shapes of the second recesses X2 and Y2 are not particularly limited. They may be various shapes, such as a square or substantially square shape, a circular or substantially circular shape, or an elliptical or substantially elliptical shape.

Preferred embodiments of the present invention are also applicable to the case in which alignment objects whose WT surfaces are prismatic or substantially prismatic shapes, which are square or substantially square shapes, or shapes that approximate thereto are transferred and aligned. These cases also provide the same advantages.

In the above-described preferred embodiments, the case in which an alignment object is an unfired ceramic multilayer structure (multilayer ceramic capacitor element) formed by performing a process for producing a multilayer ceramic capacitor is described. However, according to various preferred embodiments of the present invention, the type of alignment object is not particularly limited. Preferred embodiments of the present invention are widely applicable to cases in which chip members and various other members formed by performing a process for producing other electronic components, such as chip inductors and chip resistors, are aligned.

In the above-described preferred embodiments, the case in which an alignment object preferably is an unfired ceramic multilayer structure is described. However, the alignment object may be a fired ceramic multilayer structure.

In the above-described preferred embodiments, the case in which alignment objects preferably are aligned in a step prior to applying a conductive paste is described. However, the aligning device according to the present invention is applicable to various other steps, such as a step prior to examining characteristics and a packaging step.

The present invention is not limited to the above-described preferred embodiment regarding other points. Various applications and modifications may be made within the scope of the present invention regarding specific structures of the first and second transfer jigs (such as the arrangement and specific shapes, structures, dimensions, and the like of the cavities X and Y).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An aligning device comprising:
a first transfer jig including a cavity that includes a first recess and a second recess configured such that an alignment object to be transferred is capable of being transferred into the cavity, the first recess opening towards a principal surface, the second recess being adjacent to the first recess in a depth direction and communicating with the first recess; and
a second transfer jig including a cavity that includes a first recess and a second recess configured such that the alignment object is capable of being transferred into the cavity of the second transfer jig, the first recess of the second transfer jig opening towards the principal surface, the second recess of the second transfer jig being adjacent to the first recess of the second transfer jig in the depth direction and communicating with the first recess of the second transfer jig; wherein
in plan view, the first recess of the first transfer jig has a shape and dimensions that allow an entire region of the second recess of the first transfer jig to be situated within the first recess of the first transfer jig by a predetermined interval;
in plan view, the first recess of the second transfer jig has a shape and dimensions that allow an entire region of the second recess of the second transfer jig to be situated within the first recess of the second transfer jig by a predetermined interval;
when the first transfer jig and the second transfer jig are caused to overlap with each other, in plan view, the first recess of the second transfer jig has the shape and dimensions that allow the entire region of the second recess of the first transfer jig to be situated within the first recess of the second transfer jig by a predetermined interval; and
with the alignment object being transferred into the cavity of the first transfer jig, by causing the first transfer jig and the second transfer jig to overlap with each other so that the principal surfaces oppose each other, the alignment object transferred into the cavity of the first transfer jig is transferred to the cavity of the second transfer jig.

2. The aligning device according to claim 1, wherein a bottom of the second recess of the first transfer jig is provided with a through hole.

3. The aligning device according to claim 1, wherein a bottom of the second recess of the second transfer jig is provided with a through hole.

4. The aligning device according to claim 1, wherein when dimensions of the alignment object are such that a thickness, a width, and a length are T, W, and L, respectively, a relationship $T<W<L$ is satisfied.

5. The aligning device according to claim 1, wherein the alignment object is a multilayer structure in which a ceramic layer and an internal electrode are disposed on each other.

6. The aligning device according to claim 1, wherein the second transfer jig includes a first plate member including a through hole that defines the first recess of the second transfer jig, and a second plate member which is configured to overlap the first plate member, which includes the second recess of the second transfer jig in cooperation with the first recess of the second transfer jig to define the cavity of the second transfer jig, and which is separable from the first plate member.

7. The aligning device according to claim 1, wherein the first transfer jig is made of a resin and the second transfer jib is made of metal.

8. The aligning device according to claim 1, wherein the first recess of the cavity of the first transfer jig has a substantially tapering inclined configuration and a substantially mortar-shaped configuration.

9. The aligning device according to claim 1, wherein the second recess of the cavity of the first transfer jig has a substantially strip-shaped configuration with rounded ends.

10. The aligning device according to claim 1, wherein the first recess of the cavity of the second transfer jig has a diameter that is greater than a maximum dimension of the second recess of the cavity of the second transfer jig.

11. The aligning device according to claim 10, wherein the second recess of the cavity of the second transfer jig includes a circular or substantially circular space.

12. The aligning device according to claim 1, wherein the second recess of the cavity of the second transfer jig has a substantially strip-shaped configuration with rounded ends.

13. The aligning device according to claim 1, wherein each of the second recess of the cavity of the first transfer jig and the second recess of the cavity of the second transfer jig is one of strip-shaped, substantially strip-shaped, square, substantially square, circular, substantially circular, elliptical, and substantially elliptical.

* * * * *